US010035234B2

(12) United States Patent
Halcomb et al.

(10) Patent No.: US 10,035,234 B2
(45) Date of Patent: Jul. 31, 2018

(54) MACHINE TOOL

(71) Applicant: Yamazaki Mazak Corporation, Niwa-gun (JP)

(72) Inventors: Christopher Halcomb, Cincinati, OH (US); Sami H. Winkelman, Cincinati, OH (US); Takuya Ii, Florence, KY (US)

(73) Assignee: YAMAZAKI MAZAK CORPORATION, Aichi (JP)

( * ) Notice: Subject to any disclaimer, the term of this patent is extended or adjusted under 35 U.S.C. 154(b) by 122 days.

(21) Appl. No.: 15/361,498

(22) Filed: Nov. 28, 2016

(65) Prior Publication Data
US 2017/0072524 A1 Mar. 16, 2017

Related U.S. Application Data

(63) Continuation of application No. PCT/JP2015/075228, filed on Sep. 4, 2015.
(Continued)

(51) Int. Cl.
*B23B 3/16* (2006.01)
*B23Q 16/02* (2006.01)
(Continued)

(52) U.S. Cl.
CPC ............... *B23Q 16/02* (2013.01); *B23C 1/06* (2013.01); *B23C 1/14* (2013.01); *B23Q 5/10* (2013.01);
(Continued)

(58) Field of Classification Search
CPC ..... Y10T 82/2552; Y10T 82/2554; B23B 3/16; B23Q 2005/05; B23Q 5/04; B23Q 5/10;
(Continued)

(56) References Cited

U.S. PATENT DOCUMENTS 2,561,724 A 7/1951 Bickel
3,458,881 A 8/1969 Drechsler et al.
(Continued)

FOREIGN PATENT DOCUMENTS

CN 1636656 7/2005
CN 103639710 3/2014
(Continued)

OTHER PUBLICATIONS

Extended European Search Report for corresponding EP Application No. 15838038.6-1702, dated Jun. 16, 2017.
(Continued)

*Primary Examiner* — Daniel Howell
*Assistant Examiner* — Yasir Diab
(74) *Attorney, Agent, or Firm* — Mori & Ward, LLP

(57) ABSTRACT

A machine tool for implementing machining with rotation, the machine tool includes a first rotor, an enclosure, a first rail, a second rail, and a coupler. The first rotor rotates about a rotational axis. The first rotor is surrounded with the enclosure. The first rail is disposed on the first rotor. The second rail is disposed on the enclosure so as to be brought into alignment with the first rail at a rotational position. The coupler moves along the first rail and the second rail. The coupler is to engage with the first rail and the second rail in a first state and to engage with the second rail without engaging with the first rail in a second state.

20 Claims, 15 Drawing Sheets

Related U.S. Application Data

(60) Provisional application No. 62/046,804, filed on Sep. 5, 2014.

(51) Int. Cl.
*B23C 1/06* (2006.01)
*B23C 1/14* (2006.01)
*B23Q 5/10* (2006.01)
*B23Q 5/12* (2006.01)
B23Q 5/04 (2006.01)
B23Q 5/00 (2006.01)

(52) U.S. Cl.
CPC ............ *B23Q 5/12* (2013.01); *B23Q 16/025* (2013.01); *B23B 3/16* (2013.01); *B23Q 5/04* (2013.01); *B23Q 2005/005* (2013.01)

(58) Field of Classification Search
CPC .... B23Q 16/02; B23Q 16/021; B23Q 16/022; B23Q 16/025
USPC ........................ 173/47, 217, 216, 178, 213
See application file for complete search history.

(56) References Cited

U.S. PATENT DOCUMENTS

| | | | |
|---|---|---|---|
| 3,483,767 A | 12/1969 | Schachte | |
| 3,604,998 A | 9/1971 | Haught et al. | |
| 4,253,359 A | 3/1981 | Youden | |
| 4,351,096 A | 9/1982 | Depweg et al. | |
| 4,417,486 A | 11/1983 | Tsukiji et al. | |
| 4,499,792 A | 2/1985 | Tanabe | |
| 7,290,316 B2 | 11/2007 | Muscarella et al. | |
| 8,172,004 B2 * | 5/2012 | Ho | B23B 45/008 173/176 |
| 8,776,910 B1 * | 7/2014 | Dallas | B25B 23/141 173/1 |
| 2005/0166728 A1 | 8/2005 | Kato | |
| 2006/0156522 A1 | 7/2006 | Xiao | |
| 2011/0247441 A1 | 10/2011 | Kang | |
| 2012/0168190 A1 | 7/2012 | Linder et al. | |
| 2013/0168118 A1 * | 7/2013 | Yamane | B23Q 5/04 173/29 |
| 2013/0186662 A1 * | 7/2013 | Argent | E21B 4/006 173/47 |

FOREIGN PATENT DOCUMENTS

| | | |
|---|---|---|
| DE | 10 2010 022 402 | 12/2011 |
| EP | 2062681 | 5/2009 |
| EP | 2808108 | 12/2014 |
| JP | 63-174841 | 7/1988 |
| JP | 63-191549 | 8/1988 |
| JP | 03-010737 | 1/1991 |
| JP | 2000-271804 | 10/2000 |
| JP | 2003-170334 | 6/2003 |
| JP | 2000-271804 | 10/2003 |
| WO | WO 2010/071299 | 6/2010 |
| WO | WO 2011/035866 | 3/2011 |
| WO | WO 2013/111956 | 8/2013 |

OTHER PUBLICATIONS

International Preliminary Report on Patentability (Chapter I) with translation of Written Opinion of the International Searching Authority for corresponding International Application No. PCT/JP2015/075228, dated Mar. 16, 2017.

Chinese Office Action for corresponding CN Application No. 201580014756.4, dated Mar. 30, 2017.

Search Report issued by National Patent Services, dated Apr. 9, 2014, Arlington, VA, USA.

International Search Report for corresponding International Application No. PCT/JP2015/075228, dated Nov. 24, 2015.

* cited by examiner

MACHINE TOOL

CROSS-REFERENCE TO RELATED APPLICATIONS

The present application is a continuation application of International Application No. PCT/JP2015/075228, filed Sep. 4, 2015, which claims priority to U.S. Provisional Application No. 62/046,804, filed Sep. 5, 2014. The contents of these applications are incorporated herein by reference in their entirety.

BACKGROUND OF THE INVENTION

Field of the Invention

The present invention relates to a machine tool.

Discussion of the Background

Machining equipment (a machine tool), such as a CNC turning center, typically incorporates a single integral spindle motor in a spindle housing for rotating the spindle, which holds a workpiece. Because such a motor drives the spindle directly, a gear transmission is not required. The drive mechanism by the motor will turn the spindle at high speeds for a turning operation, such as removing material to reduce the outside diameter of the workpiece. The same motor may also be used for low speed, precisely controlled angular rotation of the spindle for C-axis contouring or milling However, for larger diameter workpieces, such as those having a larger spindle bore, the motor may not be available or economically feasible to produce. For a turning center to machine such workpieces, a separate motor with a gear transmission may be used to rotate the spindle. However, such a drive configuration with the gear transmission is not well suited for machining operations that require high accuracy, such as C-axis contouring, because accuracy to position the rotational angle of the spindle is lost due to backlash or play in the gear transmission.

Driving a turntable for supporting a workpiece to be subjected to machining, such as that of a vertical machining center, with two separate motors is known in the art. For example, a turntable may be driven with one motor for high and medium speed operations, and a servo motor for low speed or indexing operations. In such a system, both the motors are connected to the rotor via gear transmissions. Such a drive configuration is not well-suited for contouring applications due to the inaccuracies introduced by the gear transmissions. It is noted that, for example, Japanese Unexamined Patent Application Publication No. S63-191549 and Japanese Unexamined Patent Application Publication No. 2003-170334 each disclose the conventional art concerning the invention.

SUMMARY OF THE INVENTION

According to one aspect of the present invention, a machine tool for implementing machining with rotation, the machine tool includes a first rotor, an enclosure, a first rail, a second rail, and a coupler. The first rotor rotates about a rotational axis. The first rotor is surrounded with the enclosure. The first rail is disposed on the first rotor. The second rail is disposed on the enclosure so as to be brought into alignment with the first rail at a rotational position. The coupler moves along the first rail and the second rail. The coupler is to engage with the first rail and the second rail in a first state and to engage with the second rail without engaging with the first rail in a second state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
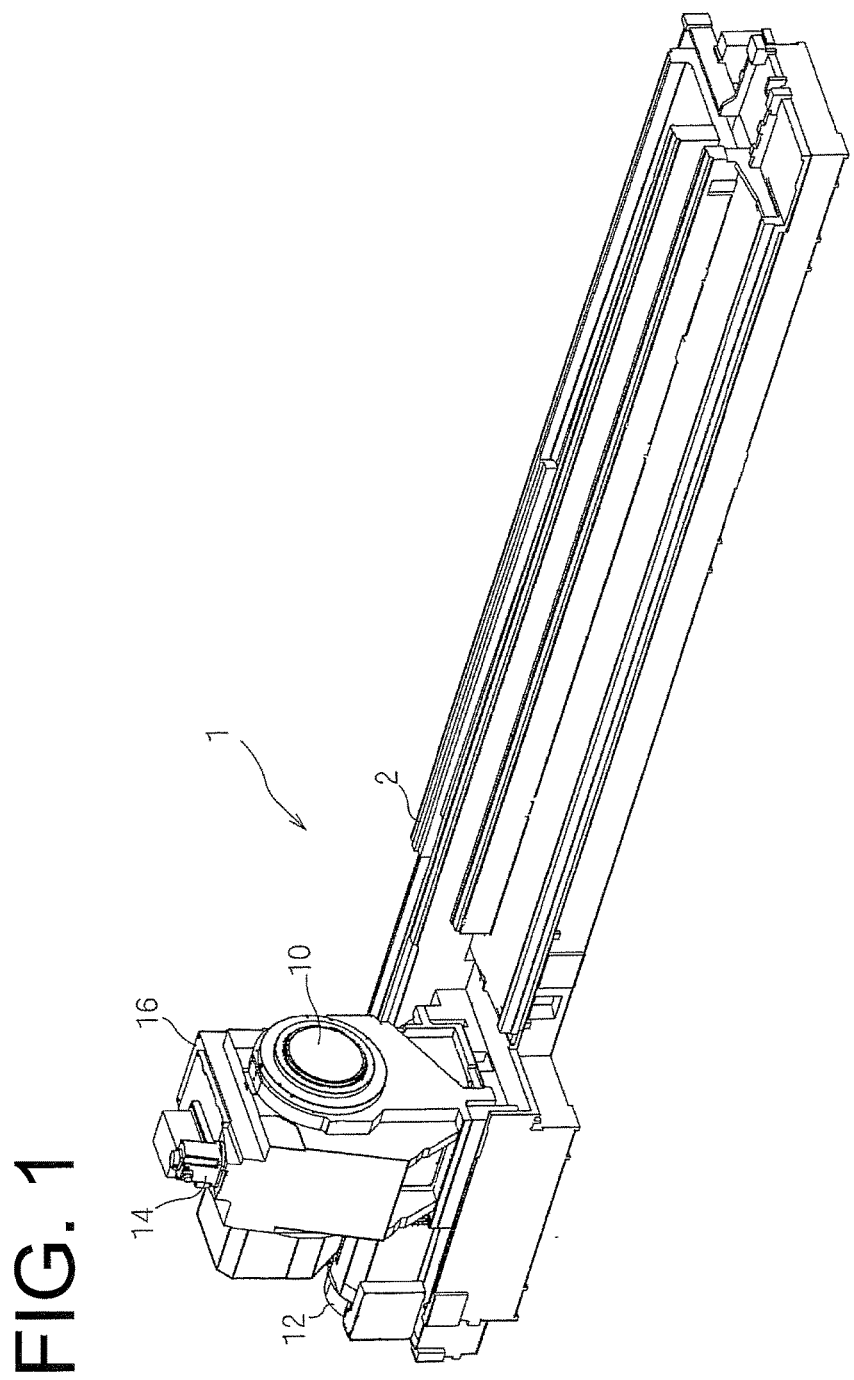
FIG. 1 is a perspective view of an exemplary machine tool with a tool head unit omitted.

The embodiments will now be described with reference to the accompanying drawings, wherein like reference numerals designate corresponding or identical elements throughout the various drawings.

In accordance with one aspect, a machine tool provided with a spindle drive system includes a spindle, a first motor, and a first transmission. The spindle is a member for holding and rotating a workpiece about its longitudinal axis. The first motor may drive the spindle. The first transmission is operably connected to the spindle and the first motor for driving the spindle with the first motor. The machine tool also includes a second motor and a second transmission. The second motor may drive the spindle. The second transmission is operably connected to the spindle and the second motor for driving the spindle with the second motor. The second transmission includes a selectively fixable transmission element. The transmission element is mounted about the spindle having a free configuration. The transmission element may be free to rotate about the spindle such that the second motor is not connected to the spindle. The second transmission has a fixed configuration, and the transmission element is fixed relative to the spindle such that the second motor is operably engaged with the spindle. The machine tool may subject the workpiece to milling with high accuracy when driving the spindle with the second motor. The machine tool to be used together with the large-sized spindle allows C-axis milling with higher accuracy than a known machine tool provided with a large spindle drive system.

In one form, the second transmission includes a plurality of cam followers, such as rollers, mounted to the transmission element. The transmission element of the second transmission may include an outer annular ring member rotatably mounted about the spindle. A locking mechanism is operable for shifting the transmission element of the second transmission between a fixed configuration and a free configuration. In the locked configuration (the fixed configuration), the locking mechanism fixes the transmission element to the spindle. In the unlocked configuration (the free configuration), the locking mechanism releases the transmission element from fixed engagement with the spindle to disconnect the second motor from the spindle.

In some forms, an inner annular ring or flange portion is fixedly disposed or formed about the spindle, and the transmission element includes a portion that is rotatably disposed about the inner annular ring portion. In this form, the locking mechanism is configured to fix the outer annular ring portion to the inner annular ring portion with the locking mechanism in the locked configuration and to release the outer annular ring portion from the inner annular ring portion with the locking mechanism in the unlocked configuration. The locking mechanism may include a rail (i.e., a second rail) disposed on the outer annular ring portion, a rail (i.e., a first rail) disposed on the inner annular ring portion, and a locking member operably connected to an actuator. The actuator couples the first rail and the second rail in the locked configuration of the locking mechanism and uncouples the rails in the unlocked configuration of the locking mechanism when the first rail and the second rail are aligned to respectively fix or release the outer annular ring portion with respect to the inner annular ring portion.

In one form, the second motor is a servo motor which drives a driveshaft that is adjacent the spindle and extends transversely to the longitudinal axis of the spindle. The second transmission includes a cam, such as a roller gear cam, that is attached to the driveshaft and rotates about the longitudinal axis of the driveshaft. The transmission element of the second transmission may include an outer annular ring member. The outer annular ring member is rotatably disposed about the spindle with the plurality of rollers mounted about the outer annular ring member.

In another form according to the present invention, a machine tool includes a spindle, a motor, a transmission, and a locking mechanism. The transmission includes a transmission element for driving the spindle with the motor. The transmission element is operably engaged with the motor and is rotatably mounted about the spindle. A locking mechanism is shiftable between a locked orientation and an unlocked orientation. In the locked orientation, the locking mechanism fixes the rotatably mounted transmission element to the spindle for driving the spindle with the motor via the transmission element. In the unlocked orientation, the locking mechanism disengages the transmission element from the spindle to allow the transmission element to rotate independently with respect to the spindle to disconnect the motor from the spindle.

In one form, the rotatably mounted transmission element is a turret unit which includes an annular ring member rotatably mounted to the spindle. The annular ring member may include an outer surface portion and a plurality of roller members disposed on the outer surface portion thereof. In one form, the roller members each comprise a rotational axis, and each rotational axis of each of the plurality of roller members extends radially outwardly from the outer surface portion of the annular ring member. The transmission in some forms includes a roller gear cam, and the roller gear cam is operably engaged with at least one of the plurality of roller members for driving the roller members and rotating the annular ring member when the roller gear cam is rotated by the motor.

In another form according to the present invention, a machine tool, which is machining equipment, includes a spindle, a first motor, a second motor, a driveshaft, a cam, and a plurality of cam followers. The spindle is a member for rotating a workpiece. The first motor rotates the spindle at higher speeds. The second motor rotates the spindle at lower speeds. The driveshaft is a driveshaft of the second motor and has a longitudinal axis. The cam, such as a roller gear cam, is connected to the driveshaft. The cam followers are mounted radially about the spindle. The cam engages with the cam follower for rotating the spindle. The machine tool may include an annular ring member that is rotatably mounted about the spindle, with the plurality of cam followers in the form of roller members mounted radially about the annular ring member. In one form, a locking mechanism is provided for selectively coupling and uncoupling the annular ring member with respect to the spindle. The locking mechanism may include a slideable coupling shiftable between a coupled configuration and an uncoupled configuration. In the coupled configuration, the slideable coupling couples the annular ring member to the spindle. In the uncoupled configuration, the slideable coupling is remote from the spindle to uncouple the annular ring member from the spindle. The locking mechanism may also include a rail (i.e., a second rail) connected to the annular ring member and a rail (i.e., a first rail) connected to the spindle. The slideable coupling slides along each rail to shift to the coupled configuration when the first rail and the second rail are aligned. The driveshaft of the second motor in one form is directly connected to the cam such that the cam rotates together with the driveshaft about the longitudinal axis of the driveshaft. The invention will be described in connection with illustrated embodiments, although the invention is not limited to the illustrated embodiments.

EMBODIMENTS

Figure 2:
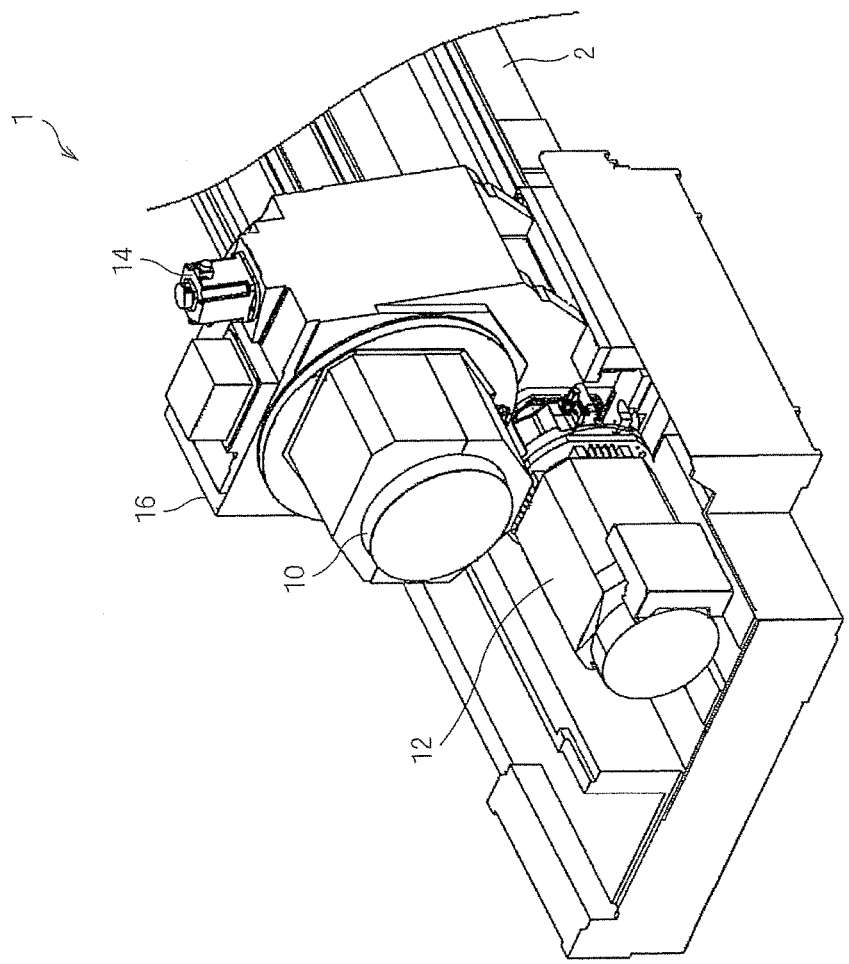
FIG. 2 is a perspective view illustrating a spindle part of the machine tool.
Figure 3:
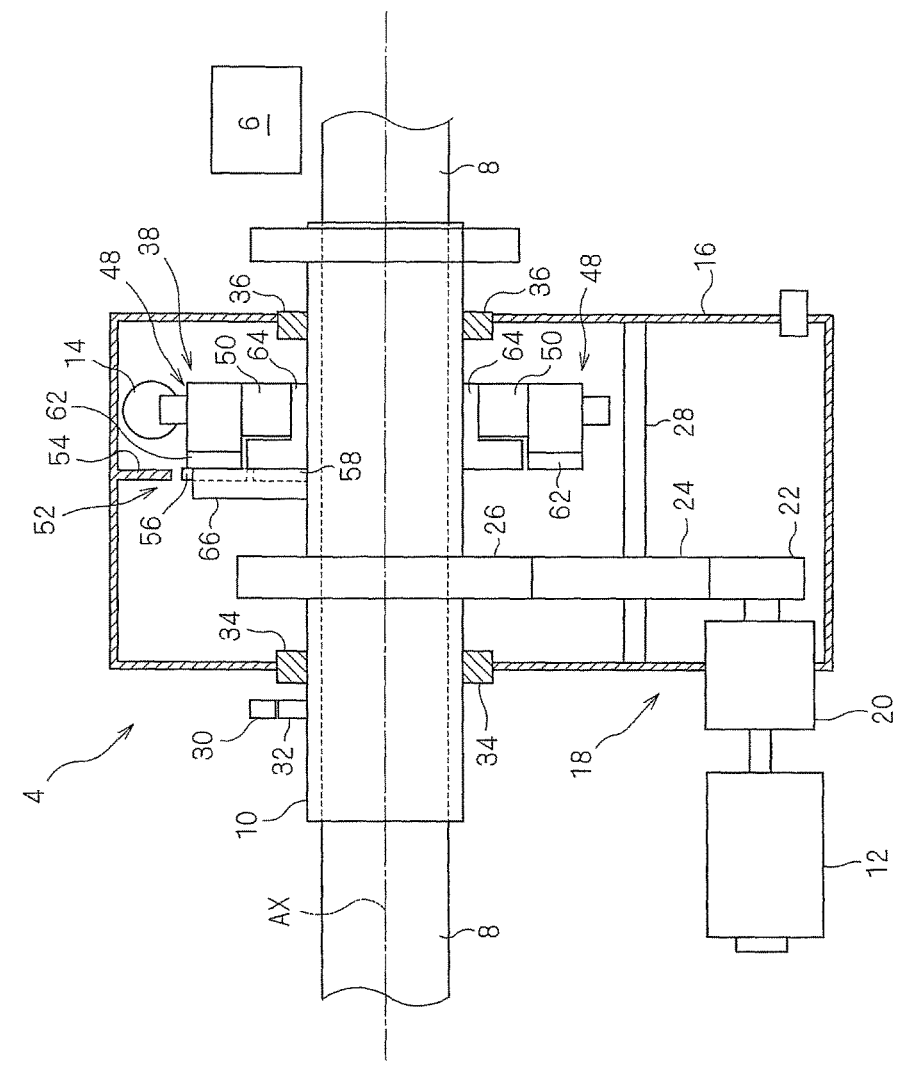
FIG. 3 is a schematic representative illustrating the configuration of a spindle drive system.

As illustrated in FIG. 1 and FIG. 2, a turning center (to be understandable as a machine tool) 1 includes a frame 2 for supporting one or more tool heads 6 (see FIG. 3) for cutting a workpiece 8 (see FIG. 3). Referring to FIG. 3 that illustrates the main components of the machine tool 1 according to this embodiment, the metal workpiece 8, such as a pipe, may be held and rotated with a spindle 10 (to be understandable as a first rotor). This allows a cutting tool to cut the rotating workpiece 8 (i.e., to implement machining with rotation), e.g., to reduce the outside diameter of the workpiece 8. The machine tool 1 is provided with a spindle drive system 4. The spindle drive system 4 includes a first, larger motor 12 (to be understandable as a first rotary drive part) and a second, smaller motor 14 (to be understandable as a second rotary drive part) for selectively driving the horizontally oriented, larger spindle 10 such as that having a bore diameter greater than 7". The spindle 10 is configured to hold the large workpiece 8 cantilevered from the spindle 10, although one or more workpiece supports may be used to support the workpiece 8 along its length. In the illustrated spindle drive system 4, the first, larger motor 12 is used to drive the spindle 10 for high speed, high torque machining, and the second, smaller motor 14 is used for lower speed, high accuracy machining or contouring.

As illustrated in FIGS. 1, 2, at one end of the machine tool 1 is a spindle housing 16. The spindle housing 16 houses at least partially the spindle 10 and the spindle drive system 4 illustrated in FIG. 3. The first motor 12 is mounted to the frame 2. As illustrated in, for example, FIGS. 3, 4, 13, the first motor 12 is operably connected to the spindle 10 via a corresponding first transmission 18. The first transmission 18 includes a gearbox 20 and a plurality of transmission elements in the form of gears 22, 24, 26. The gearbox 20 includes a plurality of gears that allow for high speed and medium speed operations and disconnect the first motor 12 from the spindle 10. In one example, the first motor 12 may rotate the spindle 10 from 0 to 1500 RPM in a high-speed operation mode and may also rotate the spindle 10 from 0 to 500 RPM in a medium-speed operation mode. However, it is quite natural that different maximum high speeds may be obtained with different gear ratios.

The driven gear 26 is mounted about the spindle 10 and drives the spindle 10 via its operative engagement with the intermediate gear 24 and drive gear 22. The intermediate gear 24 resides on a shaft 28 and is rotatable about the shaft 28. A spindle position feedback sensor 30 and a rotary scale 32 can provide drive control with positional information of the spindle 10 to precisely control the operation of the spindle 10. The spindle 10 is mounted within bearings 34, 36 to rotatably support the spindle 10 within the spindle housing 16.

The first transmission 18 might introduce slight positional inaccuracy into the system due to backlash or play in the gears of the transmission. Therefore, the machine tool 1 according to this embodiment includes the second motor 14 and a second transmission 38 in addition to the first motor 12 and the first transmission 18. The second motor 14 and the second transmission 38 are implemented for cutting operations that require a higher degree of accuracy, such as C-axis contouring (i.e., milling the outside diameter of the workpiece 8 while precisely rotating the workpiece 8) or other milling operations. Accordingly, the spindle drive system 4 uses the first, larger and high power motor (spindle motor) 12 for machining the workpiece 8 at higher speed. The spindle drive system 4 also implements the separate second, smaller and low power motor (servo motor) 14 for low speed control of the spindle 10 and for fine positional control of the spindle 10. In one example, the first motor 12 may have a rated output which is at least 1.5 times as large as that of the second motor 14. In another example, the rated output of the first motor 12 may be not less than 10 times as large as that of the second motor 14. More specifically, in one example, the first motor 12 has an approximately 60 kW-rated output whereas the second motor 14 has an approximately 4.5 kW-rated output. However, the used motors 12, 14 may be different in rated output from each other. For example, the first motor 12 may have a rated output within a range of 10 to 100 HP whereas the second motor 14 may have a rated output ranging from 4.5 to 9.5 kW. In addition, the gear ratios of the first transmission 18 and the transmission elements of the second transmission 38 may be changed in response to different applications of the spindle drive system 4 provided with spindles 10 which are different in size from one another. For example, selecting different gear ratios allows a 60 kW-motor to be used as the first motor 12 for the spindle 10 having the bore diameter ranging from 185 mm to 375 mm so that the first motor 12 may have a torque output from 5800 N·m to 7000 N·m.

The spindle drive system 4 according to this embodiment is configured to provide the same level of accuracy as spindle drive without a transmission, that is, spindle drives that use a single, integral motor. However, one advantage of the spindle drive system 4 according to this embodiment, compared with this motor, is that the spindle drive system 4 can be provided with the larger spindle 10, such as a spindle 10 having a bore of over 7 inches. In one example, the spindle 10 according to this embodiment has a bore diameter of 375 mm, or roughly 15 inches. Accordingly, the illustrated spindle drive system 4 allows the machine tool 1 to accommodate the very large workpiece 8 while maintaining the accuracy of the machine tool 1 having the integral spindle motor suited for driving the spindle having the much smaller bore diameter.

Figure 4:
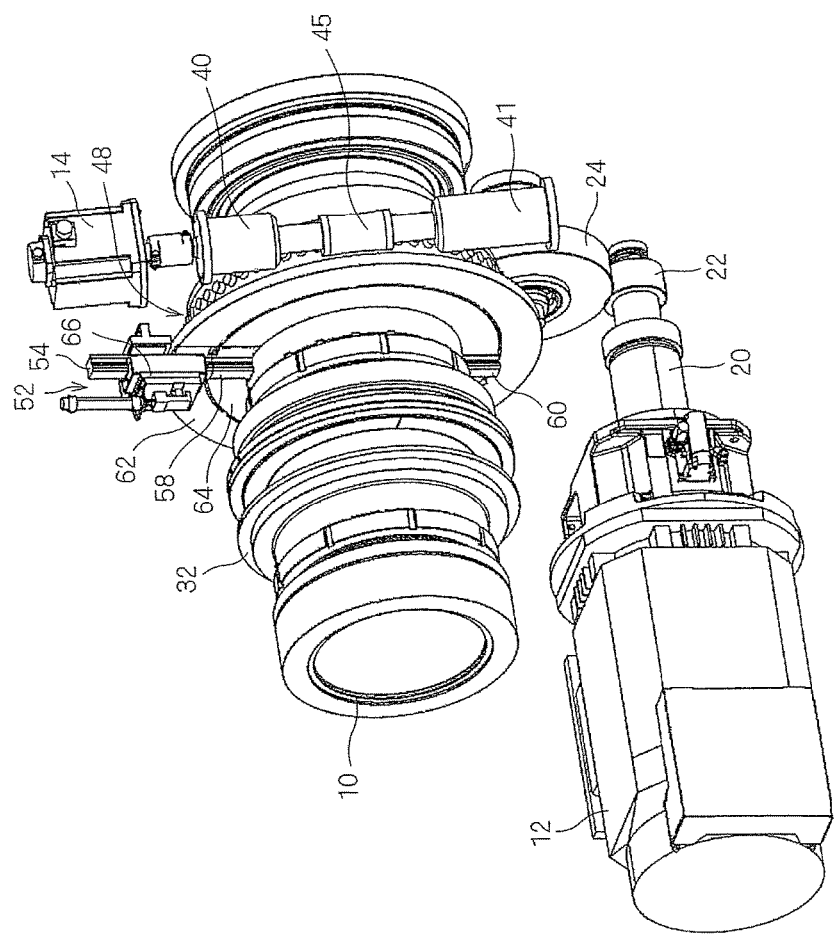
FIG. 4 is a perspective view illustrating the configuration of the spindle drive system.
Figure 5:
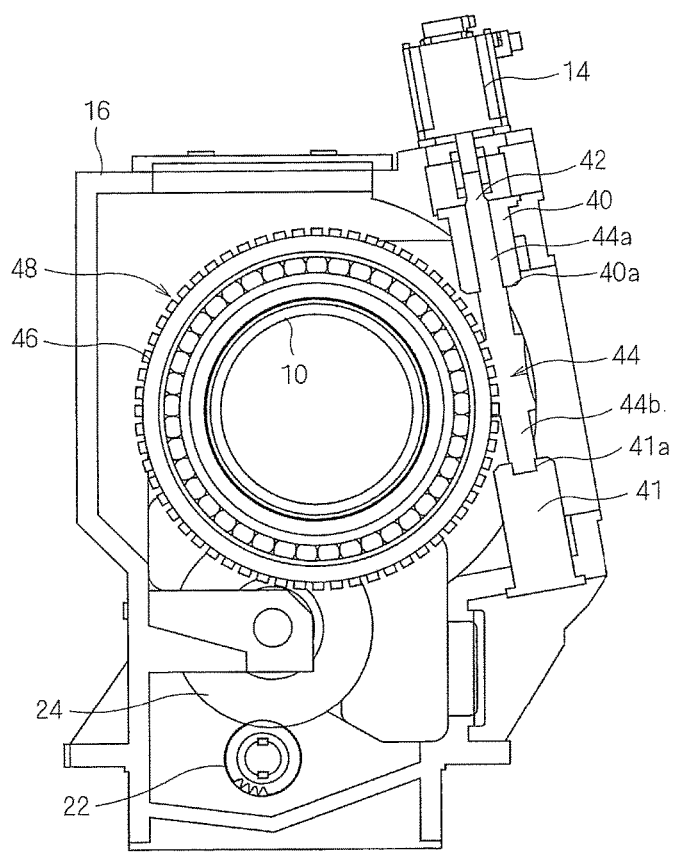
FIG. 5 illustrates the details of a second transmission.

The second motor 14 is configured to drive the spindle 10 using the second transmission 38 separate from the first transmission 18. In other words, as is clear from the following description, the second motor 14 rotates a turret unit (corresponding to an enclosure and to be understandable as a second rotor) 48 via a roller gear cam unit 44. The second motor 14 also rotates the spindle 10 via the rotation of the turret unit 48. Preferably, the first transmission 18 and the second transmission 38 are explicitly distinct and share no common transmission element, such as a driven gear mounted about the spindle 10 (e.g., the driven gear 26). In one example, the second motor 14 is a servo motor which is mounted to the spindle housing 16. With reference to FIGS. 3 to 5, the second motor 14 is disposed on one side of the spindle 10 with its driveshaft 42. The driveshaft 42 is coupled to the second transmission 38. The second transmission 38 (more specifically, the transmission element of the second transmission 38) may be selectively in a "fixed configuration". When the second transmission 38 is in the fixed configuration (i.e., when the second transmission 38 is operably engaged with the spindle 10), the second motor 14 may drive the spindle 10. In one example, the fixing of the selectively fixable transmission element to the spindle 10 is accomplished by a locking mechanism 52, which will be described in greater detail below. The fixed configuration refers to a state in which the turret unit 48 and the spindle 10 are coupled together via the second transmission 38. In contrast, an unfixed configuration refers to a state in which the turret unit 48 and the spindle 10 are not coupled via the second transmission 38. The locking mechanism 52 may switch between the fixed configuration and the unfixed configuration for the second transmission 38. When the second transmission 38 is in the fixed configuration, the second motor 14 rotates the spindle 10 together with the turret unit 48 (i.e., rotates the spindle 10 via the rotation of the turret unit 48). On the other hand, when the second transmission 38 is in the unfixed configuration, the second motor 14 rotates the turret unit 48 independently of the spindle 10 (i.e., rotates the turret unit 48 without rotating the spindle 10).

Figure 6:
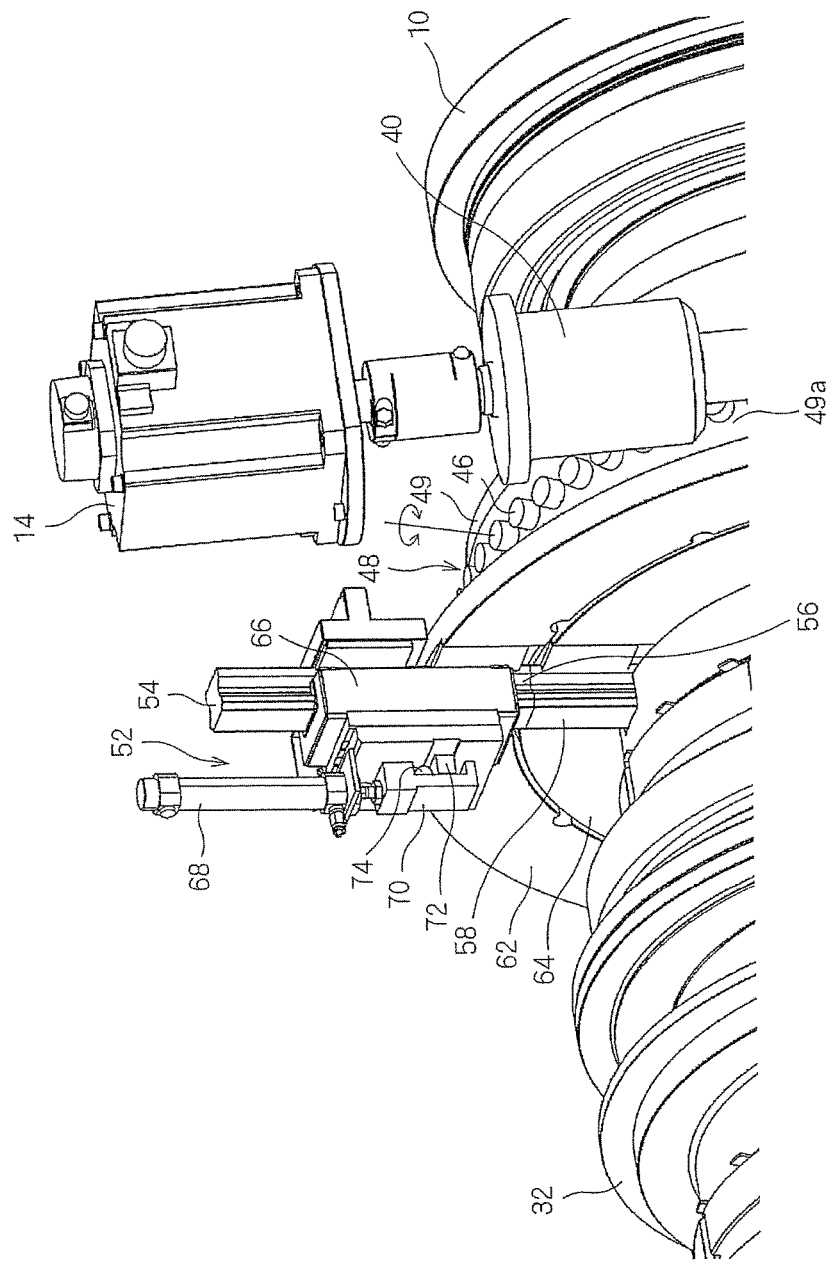
FIG. 6 is an enlarged perspective view illustrating the configuration including a locking mechanism in an unlocked configuration.

As shown in FIG. 6, the turret unit 48 to be understandable as one constituent of the second transmission 38 has an outer annular ring portion 49, and the outer annular ring portion 49 includes a plurality of cam rollers (or cam followers) 46. The respective cam rollers 46 are mounted radially (i.e., a rotational radial direction of the turret unit 48) to an outer surface portion 49a about the circumference of the outer annular ring portion 49. Each of the cam rollers 46 has a rotational axis extending in the radial direction of the turret unit 48. The second transmission 38 includes a cam, such as the roller gear cam unit 44 (see FIG. 5). The roller gear cam unit 44 is coaxially mounted to the driveshaft 42 and is aligned with the driveshaft 42. The roller gear cam unit 44 is configured to engage the plurality of cam rollers 46 at a time, as described in more detail below. The turret unit 48 is rotatably and coaxially mounted about the spindle 10 via a bearing housing 50 (as shown in FIG. 3). As shown in FIGS. 3, 4, the spindle 10 is partially enclosed with the turret unit 48. The spindle 10 rotates about a rotational axis AX, and the turret unit 48 also rotates about the same rotational axis AX. Accordingly, the spindle 10 may rotate with respect to the turret unit 48 (and vice versa) when the turret unit 48 is not coupled or fixed to the spindle 10 via the locking mechanism 52 (i.e., in the unfixed configuration).

Figure 9:
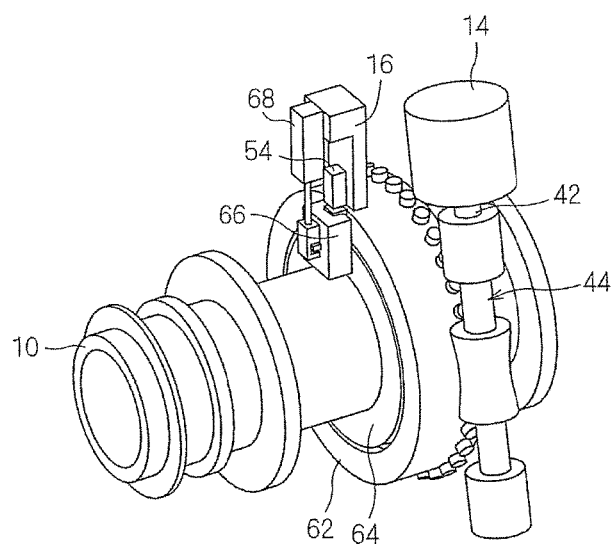
FIG. 9 is a perspective view illustrating the configuration of the second transmission being engaged with the spindle.
Figure 10:
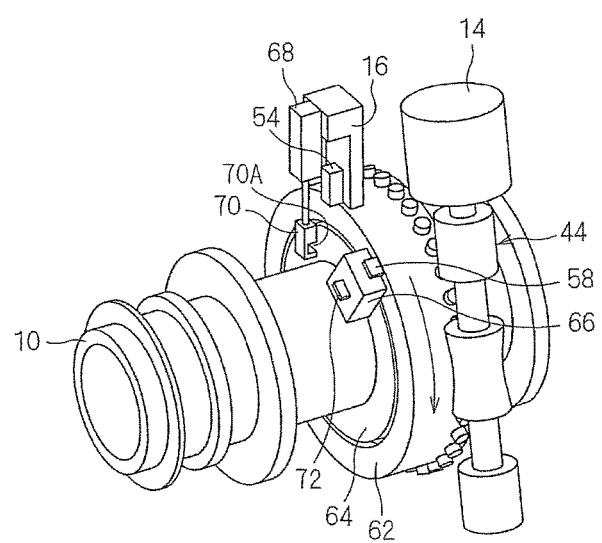
FIG. 10 is a perspective view illustrating a spindle being rotated clockwise by a second motor.
Figure 14:
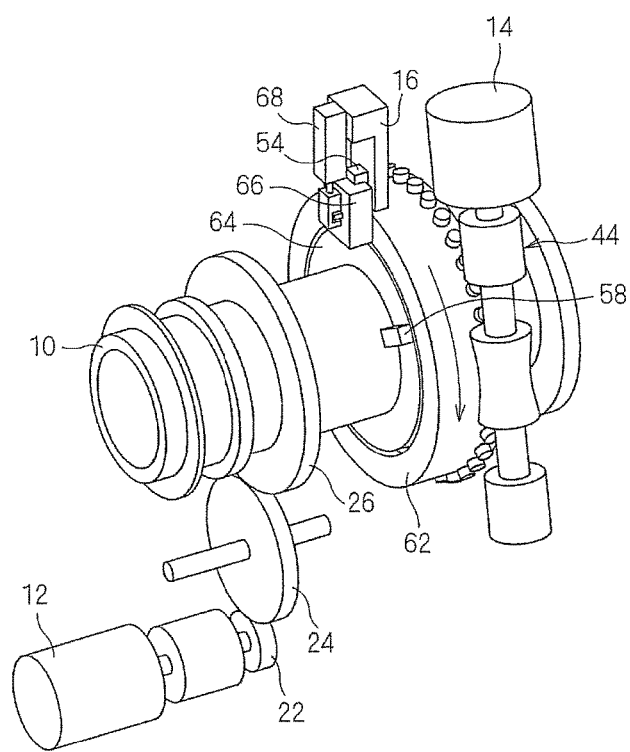
FIG. 14 is a perspective view illustrating the spindle being rotated clockwise by a first motor.

The roller gear cam unit 44, shown in, for example, FIGS. 5, 9, 14, has a central drive portion. The central drive portion has a screw-like or helical camming surface formed by a continuous wedge-shaped rib. The rib protrudes from and extends about the shank in a helical path. The screw-like or helical camming surface provides a smooth, backlash-free driving contact with the cam rollers 46. In one preferred example, the shank of the roller gear cam unit 44 has a concave profile (external appearance) similar to that of a double-envelope worm gear to increase the efficiency of the second transmission 38. As shown in FIG. 5, the roller gear cam unit 44 has shaft portions 44a, 44b extending axially from the central drive portion. The shaft portions 44a, 44b are each supported by bearings 40a, 41a near each end of the shaft portions 44a, 44b. The bearings 40a, 41a are contained in bearing housings 40, 41 as shown in FIG. 4, the central drive portion of the roller gear cam unit 44 is located in a housing 45. The housing 45 has an opening such that the roller gear cam unit 44 can be engaged with the cam rollers 46. Torque is transferred from the roller gear cam unit 44 by rolling action of the cam rollers 46. The cam rollers 46 follow along the helical path formed between adjacent portions of the camming surface of the helical rib as it rotates, such that when the roller gear cam unit 44 is rotated clockwise (as viewed from above the second motor 14), the turret unit 48 will rotate clockwise, as illustrated in FIG. 10. In the illustrated form, sixty cam rollers 46 are evenly mounted about the circumference of the outer annular ring portion 49 of the turret unit 48. Each cam roller 46 is rotatable about an axis aligned with the radius extending from the center of the turret unit 48 through the center of each cam roller 46 (see FIG. 6). The number of cam rollers 46 required will depend upon the size of the spindle 10 and other performance requirements, as would be known in the art.

The locking mechanism 52 is provided to operably engage the turret unit 48 with the spindle 10 to allow the second motor 14 to drive the spindle 10. The locking mechanism 52 will now be described in further detail. In one example, the locking mechanism 52 includes a plurality of coupling elements (to be understandable as constituents including a first rail 58 and a second rail 56) to be operably coupled to the spindle 10 and the turret unit 48. To fix the turret unit 48 to the spindle 10, the spindle 10 and the turret unit 48 can be selectively coupled together when the coupling elements (more specifically, the first rail 58 and the second rail 56 shown in FIGS. 6, 7, 11) are brought into alignment with each other. When the coupling elements are aligned with each other, the longitudinal axis of each aligned coupling element extends in a radial direction with respect to the circumference of the spindle 10 (the radial direction being understandable as the rotational radius of the spindle 10). As shown in, for example, FIG. 7, thereafter, the coupling member (or coupler) 66 moves (slides) toward the center of the spindle 10 along the longitudinal axis, which extends in the radial direction, of each of the first rail 58 and the second rail 56, over the first rail 58 and the second rail 56. Thus, the first rail 58 and the second rail 56 are fixed in the aligned state (i.e., to be understandable as a first state in which the coupling member 66 engages with the first rail 58 and the second rail 56), so that both the spindle 10 and the turret unit 48 are fixed (the fixed configuration). Accordingly, the second motor 14 can drive the spindle 10 via the turret unit 48 and the locking mechanism 52.

The locking mechanism 52 illustrated in FIG. 6 includes the first rail 58, the second rail 56, and a third rail 54. The first rail 58 is disposed on the spindle 10. The spindle 10 has an annular flange (hereinafter, referred to as an inner annular ring member 64) fixedly mounted to the outer peripheral surface of the spindle 10. The first rail 58 is mounted to the inner annular ring member 64. The second rail 56 is disposed on the turret unit 48 with which the spindle 10 is enclosed. The turret unit 48 has an annular flange (hereinafter, referred to as an outer annular ring member 62) fixedly disposed on the end surface portion of the turret unit 48. The second rail 56 is mounted to the outer annular ring member 62. The inner annular ring member 64 has an outer diameter that is slightly smaller than the inner diameter of the outer annular ring member 62. The outer annular ring member 62 is thus disposed coaxially about the inner annular ring member 64. As shown in, for example, FIG. 6, when the spindle 10 is in a predetermined rotational position, the first rail 58, the second rail 56, and the third rail 54 are brought into alignment with one another. As shown in FIG. 3, moreover, the bearing housing 50 is interposed between the spindle 10 (more specifically, the inner annular ring member 64) and the turret unit 48. Accordingly, as will be described later, when the first rail 58 and the second rail 56 are not coupled together by the slide of the coupling member 66 (more specifically, to be understandable as a second state in which the coupling member 66 engages with the second rail 56 without engaging with the first rail 58), the spindle 10 and the turret unit 48 (more specifically, the inner annular ring member 64 and the outer annular ring member 62) are not coupled together, so that the spindle 10 and the turret unit 48 may rotate freely with respect to each other by the bearing housing 50. The third rail 54 is mounted to the spindle housing 16 (see FIG. 3). In other words, although the first rail 58 rotates together with the rotation of the spindle 10 and the second rail 56 rotates together with the rotation of the turret unit 48, the third rail 54 is mounted fixedly to the machine tool 1 and is therefore maintained at a stationary state. In the second state, the coupling member 66 engages with the second rail 56 and the third rail 54 without engaging with the first rail 58.

Figure 7:
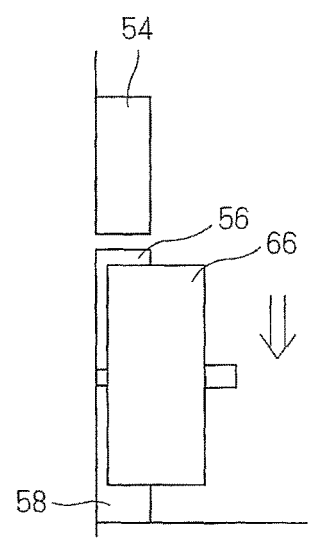
FIG. 7 is an enlarged side view illustrating the configurations of a coupling member and rails in a locked configuration.
Figure 8:
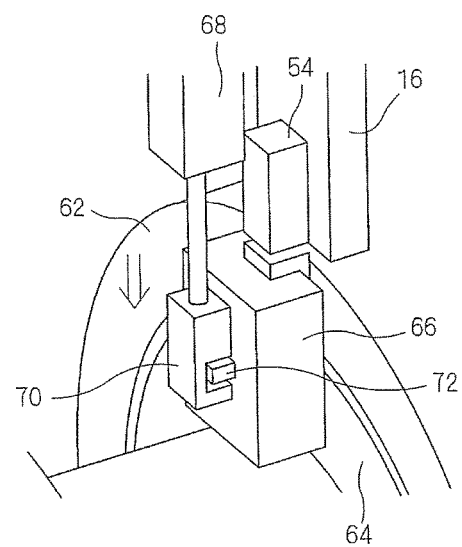
FIG. 8 is an enlarged perspective view illustrating the configurations of the coupling member and rails in the locked configuration.
Figure 11:
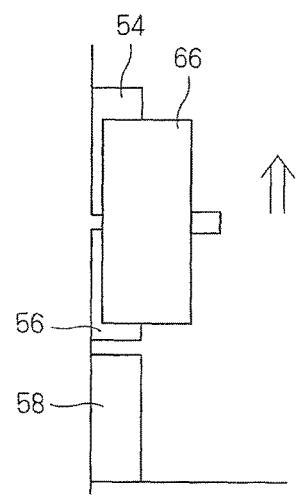
FIG. 11 is an enlarged side view illustrating the configurations of the coupling member and rails in the unlocked configuration.
Figure 12:
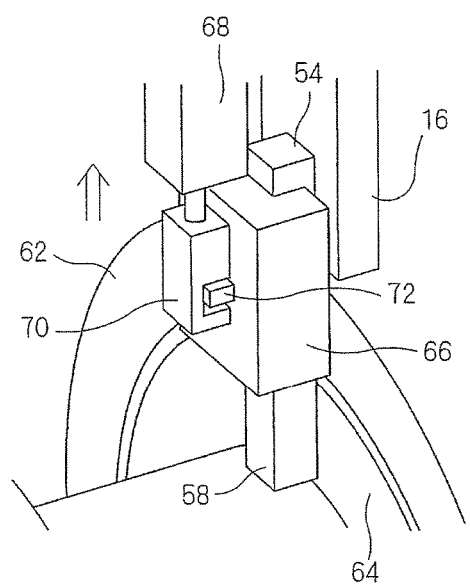
FIG. 12 is an enlarged perspective view illustrating the configurations of the coupling member and rails in the unlocked configuration.
Figure 15:
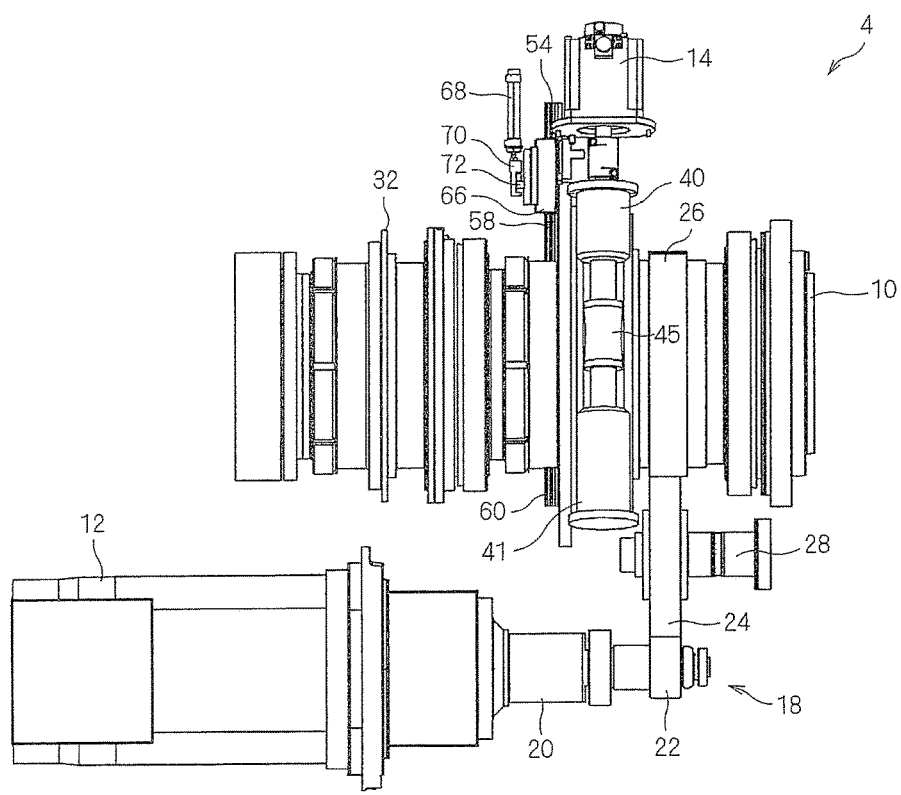
FIG. 15 is a side view illustrating the configuration of the spindle drive system.

The locking mechanism 52 further includes the coupling member 66. As shown in FIG. 6, the coupling member 66 has a generally C-shaped cross-section and is configured to engage with and slide on the respective rails 54, 56, 58. The coupling member 66 is a linear-motion guide that slides along the first rail 58, the second rail 56, and the third rail 54. As described above, in the unlocked orientation of the locking mechanism 52 (in the second state), the coupling member 66 resides on the third rail 54 and the second rail 56. As shown in FIGS. 6, 11, 12, this releases the connection between the first rail 58 and the second rail 56 by the coupling member 66, so that the second transmission 38 is operably disengaged from the spindle 10. In the second state, accordingly, the first motor 12 rotates the spindle 10. To allow the second motor 14 to drive the spindle 10, the first motor 12 rotates the spindle 10 to the home position, that is, until the first rail 58 is brought into alignment with the second rail 56 at the top of the spindle 10 (12 o'clock) (to be understandable as a predetermined rotational position) (for example, the first motor 12 rotates the spindle 10 such that the state in FIG. 14 shifts to the state in FIG. 13). The coupling member 66 may then be slid downwards onto the first rail 58 and the second rail 56 by an actuator, such as a hydraulic actuator (to be understandable as a drive part) 68 (that is, the coupling member 66 is engaged with the first rail 58 and the second rail 56 (the first state); see FIGS. 7, 8). As shown in FIGS. 7, 8, the coupling member 66 no longer resides on any portion of the third rail 54. After the first rail 58 has moved to the home position so as to be brought into alignment with the second rail 56, the gearbox 20 operably disengages the first motor 12 from the spindle 10 (the first transmission 18 is shifted to neutral) prior to the driving by the second motor 14. To keep a balance with respect to the locking mechanism 52, one or more additional first rails 60 may be disposed on the inner annular ring member 64 so as to be spaced apart from the first rail 58. For example, as illustrated in FIGS. 4, 15, the additional first rails 60 are disposed on the inner annular ring member 64 spaced 180 degrees from the first rail 58.

As shown in, for example, FIGS. 8 to 10, 12 to 14, the hydraulic actuator 68 is fixed to the spindle housing 16 (the machine tool 1). As shown in, for example, FIG. 6, the hydraulic actuator 68 has a contact portion 70, and the coupling member 66 has a protruding portion 72. The contact portion 70 selectively engages with the protruding portion 72. As shown in FIG. 6, the contact portion 70 has a recess shape that engages with the protruding portion 72. To shift the locking mechanism 52 into the locked configuration, the hydraulic actuator 68 displaces the contact portion 70 downwards and the contact portion 70 pushes the protruding portion 72 down, so that the coupling member 66 is pushed down towards the first rail 58. As shown in FIG. 6, the contact portion 70 may have a cam follower 74 at a position brought into contact with the protruding portion 72. The cam follower 74 is rotatably mounted inside the recess shape of the contact portion 70 about the longitudinal axis parallel to the longitudinal axis of the spindle 10 so as to be brought into contact with an upper surface of the protruding portion 72. Once the coupling member 66 resides completely on the first rail 58 and the second rail 56, the outer annular ring member 62 is fixed to the inner annular ring member 64, thereby fixing the turret unit 48 of the second transmission 38 to the spindle 10. The turret unit 48 may thus rotate together with the spindle 10. As shown in FIG. 10, accordingly, in the first state (fixed configuration), the second motor 14 is operably engaged with the spindle 10 to rotate the turret unit 48, so that the second motor may drive the spindle 10 via the respective rails 56, 58 and the coupling member 66.

While the coupling member 66 resides on the second rail 56 and the first rail 58 and rotates together with the inner annular ring member 64 and the outer annular ring member 62 when the spindle 10 is rotated by the second motor 14, the hydraulic actuator 68 remains in an extended position (see FIG. 10). In this state, the contact portion 70 is positioned by the hydraulic actuator 68 such that the contact portion 70 may retract the coupling member 66 back upwards to its initial position on the third rail 54 and second rail 56 when the coupling member 66 is returned to the home position. The contact portion 70 may be brought into contact with the protruding portion 72 in the rotational radial direction of the spindle 10, but is not brought into contact with the protruding portion 72 in the rotational direction of the spindle 10. Because the contact portion 70 has the recess shape, the protruding portion 72 can pass between the legs of the recess of the contact portion 70 even when the spindle 10 is rotated by the second motor 14 during, for example, milling. When the protruding portion 72 passes the contact portion 70, the cam follower 74 of the contact portion 70 comes into contact with the protruding portion 72. The cam follower 74 minimizes the contact resistance between the members 72, 74, which are in contact with each other.

Figure 13:
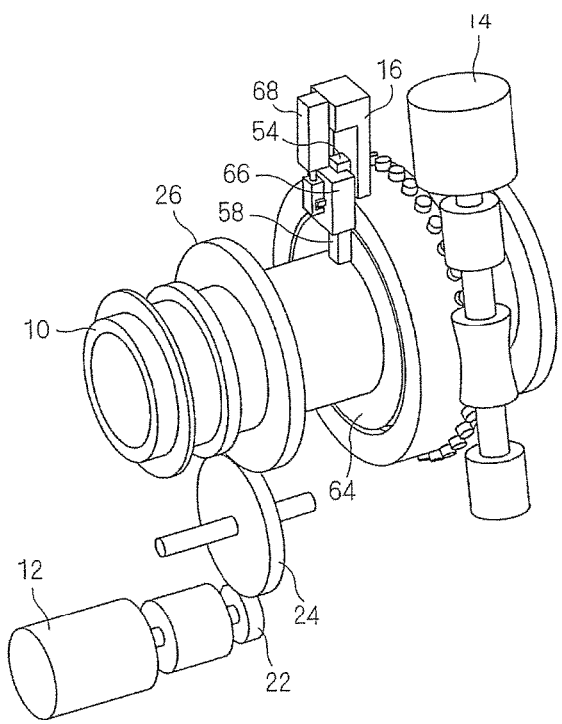
FIG. 13 is a perspective view illustrating the configuration of the second transmission disengaged with the spindle.

In order to disengage the second motor 14 and the second transmission 38 from the spindle 10, the spindle 10 must be rotated by the second motor 14 until the second rail 56, the first rail 58, and the coupling member 66 are returned to the home position. At the home position, the rails 54, 56, 58 are aligned with one another, and the hydraulic actuator 68 may be retracted. As shown in FIGS. 11, 12, more specifically, the coupling member 66 is pulled upwards by the contact portion 70 (the second state, the unfixed configuration) until the coupling member 66 is returned to its initial position on the third rail 54 and second rail 56 (corresponding with the unlocked orientation of the locking mechanism 52). A position sensor may be used to conform that the coupling member 66 has returned to this position. Then the first motor 12 may be shifted out of the neutral state at the gearbox 20 into the high speed mode or the medium speed mode and then drive the spindle 10 through the first transmission 18 as shown in FIG. 13 and FIG. 14.

The machine tool 1 according to this embodiment includes the spindle 10 that rotates about the rotational axis AX, and the turret unit 48 with which the spindle 10 is enclosed. The machine tool 1 also includes the first rail 58, the second rail 56, and the coupling member 66. The coupling member 66 moves along the first rail 58 and the second rail 56. The coupling member 66 engages with the first rail 58 and the second rail 56 in the first state. The coupling member 66 engages with the second rail 56 without engaging with the first rail 58 in the second state.

Accordingly, the coupling member 66 may move along the first rail 58 and the second rail 56 and shift from the second state to the first state. That is, the coupling member 66 is configured to engage with the first rail 58 and the second rail 56 and to fix the spindle 10 to the turret unit 48. As described above, the coupling member 66 engages with the first rail 58 and the second rail 56, and therefore may prevent a clearance from being created between the coupling member 66 and each of the rails 58, 56 (in other words, may prevent occurrence of play or the like). Accordingly, the machine tool 1 may control the rotation of the spindle 10 with high accuracy, and therefore may machine the workpiece 8 precisely and accurately.

In the machine tool 1 according to this embodiment, the coupling member 66 slides on the first rail 58 and the second rail 56.

Accordingly, the coupling member 66 may move smoothly on the respective rails 56, 58 in the state in which no play or the like occurs between the coupling member 66 and each of the rails 56, 58. Hence, it is possible to reduce the mechanical wear in the coupling member 66 and respective rails 56, 58.

Also in the machine tool 1 according to this embodiment, the turret unit 48 rotates about the rotational axis AX and is rotatable independently of the spindle 10.

Accordingly, it is possible to rotate the turret unit 48 together with the spindle 10 in the first state and to rotate the turret unit 48 independently of the spindle 10 in the second state.

Also in the machine tool 1 according to this embodiment, the first rail 58 is disposed on the spindle 10 along the rotational radius of the spindle 10. Moreover, the second rail 56 is disposed on the turret unit 48 along the rotational radius.

Accordingly, it is possible to employ the configuration that moves the coupling member 66 in the rotational radial direction and to realize the displacement between the first state and the second state by the movement in the rotational radial direction.

The machine tool 1 according to this embodiment includes the third rail 54 fixedly mounted to the machine tool 1.

As described above, since the third rail 54 is installed fixedly, the third rail 54 may be used as a mark of the predetermined rotational position where the first rail 58 and the second rail 56 are brought into alignment with each other. That is, if the machine tool 1 is required to set the rotational position, the use of the third rail 54 may facilitate this setting.

The machine tool 1 according to this embodiment further includes the hydraulic actuator 68 that actuates the coupling member 66. The coupling member 66 includes the protruding portion 72. The hydraulic actuator 68 includes the contact portion 70. The contact portion 70 may be brought into contact with the protruding portion 72 in the rotational radial direction. The contact portion 70 is not brought into contact with the protruding portion 72 in the rotational direction of the spindle 10. For example, the contact portion 70 has the recess shape 70A that engages with the protruding portion 72.

Accordingly, the contact of the hydraulic actuator 68 with the protruding portion 72 in the rotational radial direction allows the hydraulic actuator 68 to move the coupling member 66 onto the respective rails 56, 58 via the contact with the protruding portion 72. In the first state, further, the hydraulic actuator 68 does not hinder the rotations of the respective rails 56, 58 and coupling member 66 based on the rotation of the spindle 10. Accordingly, the hydraulic actuator 68 may be disposed on the fixed system rather than the rotational system including the spindle 10. That is, it is possible to prevent the hydraulic actuator 68 from rotating together with the spindle 10. It is therefore possible to simplify the configuration including the hydraulic actuator 68 and to prevent occurrence of a malfunction due to the rotation of the hydraulic actuator 68.

Also in the machine tool 1 according to this embodiment 1, the hydraulic actuator 68 includes the cam follower 74 that is disposed on the portion to be brought into contact with the protruding portion 72.

Accordingly, it is possible to prevent an impact or wear due to the rotation of the spindle 10, at the contact portion of the hydraulic actuator 68 with the protruding portion 72.

The machine tool 1 according to this embodiment further includes the roller gear cam unit 44, and the turret unit 48 includes the plurality of cam followers 46 that engage with the roller gear cam unit 44.

Accordingly, it is possible to rotate the turret unit 48 without play or the like. It is therefore possible to rotate the turret unit 48 precisely and accurately.

The machine tool 1 according to this embodiment further includes the first motor 12 and the second motor 14. The first motor 12 rotates the spindle 10. The second motor 14 rotates the spindle 10 via the turret unit 48. For example, the rotational speed of the spindle 10 driven by the first motor 12 is faster than the rotational speed of the spindle 10 driven by the second motor 14.

Accordingly, it is possible to implement highly accurate machining with lower speed rotation by rotating the spindle 10 with the second motor 14 in the first state. It is also possible to implement machining with higher speed rotation by rotating the spindle 10 with the first motor 12 in the second state.

Although the invention has been described in connection with a preferred embodiment, it will be understood that various changes in the details, materials, and arrangements of the parts and components that have been described and illustrated in order to explain the nature of the invention may be made by those skilled in the art within the principle and scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A machine tool for implementing machining with rotation, the machine tool comprising:
   a first rotor to rotate about a rotational axis;
   an enclosure with which the first rotor is surrounded;
   a first rail disposed on the first rotor;
   a second rail disposed on the enclosure so as to be brought into alignment with the first rail at a rotational position; and
   a coupler to move along the first rail and the second rail, the coupler being to engage with the first rail and the second rail in a first state and to engage with the second rail without engaging with the first rail in a second state.

2. The machine tool according to claim 1, wherein the coupler slides on the first rail and the second rail.

3. The machine tool according to claim 1, wherein the enclosure comprises a second rotor that rotates about the rotational axis and is rotatably disposed independently of the first rotor.

4. The machine tool according to claim 3, wherein the first rail is disposed on the first rotor along a rotational radius of the first rotor, and the second rail is disposed on the second rotor along the rotational radius.

5. The machine tool according to claim 3, comprising:
   a third rail mounted to the machine tool so as to be brought into alignment with the second rail at the rotational position.

6. The machine tool according to claim 4, further comprising:
   a drive part that actuates the coupler,
   wherein
   the coupler includes a protruding portion, and
   the drive part includes a contact portion that is brought into contact with the protruding portion in a rotational radial direction, but is not brought into contact with the protruding portion in a rotational direction of the first rotor.

7. The machine tool according to claim 6, wherein the drive part is fixedly disposed on the machine tool.

8. The machine tool according to claim 7, wherein the contact portion has a recess shape that engages with the protruding portion.

9. The machine tool according to claim 6, wherein the drive part includes a cam follower disposed on a portion to be brought into contact with the protruding portion.

10. The machine tool according to claim 3, further comprising:
a roller gear cam,
wherein
the second rotor includes a plurality of cam followers that engage with the roller gear cam.

11. The machine tool according to claim 3, further comprising:
a first rotary drive part that rotates the first rotor; and
a second rotary drive part that rotates the first rotor via the second rotor.

12. The machine tool according to claim 11, wherein
a rotational speed of the first rotor driven by the first rotary drive part is faster than a rotational speed of the first rotor driven by the second rotary drive part.

13. The machine tool according to claim 12, wherein
the second rotary drive part rotates the second rotor in the first state to rotate the first rotor via the first rail, the second rail, and the coupler.

14. The machine tool according to claim 12, wherein
the first rotary drive part rotates the first rotor in the second state.

15. The machine tool according to claim 1, wherein
the first rotor holds a workpiece.

16. The machine tool according to claim 4, comprising:
a third rail mounted to the machine tool so as to be brought into alignment with the second rail at the rotational position.

17. The machine tool according to claim 5, further comprising:
a drive part that actuates the coupler,
wherein
the coupler includes a protruding portion, and
the drive part includes a contact portion that is brought into contact with the protruding portion in a rotational radial direction, but is not brought into contact with the protruding portion in a rotational direction of the first rotor.

18. The machine tool according to claim 16, further comprising:
a drive part that actuates the coupler,
wherein
the coupler includes a protruding portion, and
the drive part includes a contact portion that is brought into contact with the protruding portion in a rotational radial direction, but is not brought into contact with the protruding portion in a rotational direction of the first rotor.

19. The machine tool according to claim 5, further comprising:
a first rotary drive part that rotates the first rotor; and
a second rotary drive part that rotates the first rotor via the second rotor.

20. The machine tool according to claim 6, further comprising:
a first rotary drive part that rotates the first rotor; and
a second rotary drive part that rotates the first rotor via the second rotor.

* * * * *